United States Patent
Yu et al.

(10) Patent No.: US 11,435,657 B2
(45) Date of Patent: Sep. 6, 2022

(54) LIGHT SOURCE SYSTEM AND CONTROL METHOD THEREOF, DISPLAY DEVICE AND CONTROL METHOD THEREOF

(71) Applicant: APPOTRONICS CORPORATION LIMITED, Guangdong (CN)

(72) Inventors: Xin Yu, Guangdong (CN); Chao Wu, Guangdong (CN); Fei Hu, Guangdong (CN); Yi Li, Guangdong (CN)

(73) Assignee: APPOTRONICS CORPORATION LIMITED, Guangdong (CN)

(*) Notice: Subject to any disclaimer, the term of this patent is extended or adjusted under 35 U.S.C. 154(b) by 0 days.

(21) Appl. No.: 17/273,272

(22) PCT Filed: Mar. 1, 2019

(86) PCT No.: PCT/CN2019/076617
§ 371 (c)(1),
(2) Date: Mar. 3, 2021

(87) PCT Pub. No.: WO2020/048098
PCT Pub. Date: Mar. 12, 2020

(65) Prior Publication Data
US 2021/0333698 A1    Oct. 28, 2021

(30) Foreign Application Priority Data
Sep. 3, 2018 (CN) .......................... 201811022607.4

(51) Int. Cl.
*G03B 21/20* (2006.01)
*G02B 6/35* (2006.01)
*G03B 21/00* (2006.01)

(52) U.S. Cl.
CPC .......... *G03B 21/2013* (2013.01); *G02B 6/35* (2013.01); *G03B 21/005* (2013.01); *G03B 21/206* (2013.01)

(58) Field of Classification Search
CPC .... G03B 21/005; G03B 21/006; G03B 21/28; G03B 21/204; G03B 21/206;
(Continued)

(56) References Cited

U.S. PATENT DOCUMENTS 6,575,576 B1  6/2003 Ciacci et al.
7,775,684 B2  8/2010 Sumiyama et al.
(Continued)

FOREIGN PATENT DOCUMENTS

CN    1797187 A     7/2006
CN  101261524 A     9/2008
(Continued)

OTHER PUBLICATIONS

First Office Action received in Application No. 201811022607.4, dated Mar. 2, 2021.
(Continued)

*Primary Examiner* — Sultan Chowdhury
(74) *Attorney, Agent, or Firm* — Knobbe, Martens, Olson & Bear LLP

(57) ABSTRACT

Disclosed are a light source system and a control method thereof, as well as a display device and a control method thereof. The light source system includes: an array light source, including M light emitting bodies with independently adjustable brightness; an optical switch disposed on an optical path of light outputted from the array light source, for guiding illumination light emitted by the M light emitting bodies to N sub-regions of a preset illumination region; and a control device for controlling the optical switch to adjust, at a preset frame rate, a direction of the illumination light emitted from each of at least part of the M light emitting bodies, and guiding the illumination light emitted from each of the at least part of the light emitting bodies to
(Continued)

a sub-region different from that for one or more image frames previous to the current image frame.

20 Claims, 4 Drawing Sheets

(58) Field of Classification Search
 CPC ............ G03B 21/2013; G03B 21/2033; G03B 21/2053; H04N 9/3111; H04N 9/3126; H04N 9/3138; H04N 9/3158; G02B 6/0051; G02B 6/0055; G02B 6/35
 See application file for complete search history.

(56) References Cited

U.S. PATENT DOCUMENTS

| | | | | |
|---|---|---|---|---|
| 9,630,424 | B2* | 4/2017 | Stowe | G02B 13/22 |
| 2007/0216617 | A1* | 9/2007 | Handschy | G09G 3/3406 |
| | | | | 345/84 |
| 2012/0281026 | A1* | 11/2012 | Atkins | G09G 3/003 |
| | | | | 345/690 |
| 2013/0170028 | A1 | 7/2013 | Arakawa et al. | |
| 2015/0146175 | A1* | 5/2015 | Dewald | G02B 27/283 |
| | | | | 353/69 |
| 2018/0149322 | A1* | 5/2018 | Tada | G09G 3/3406 |

FOREIGN PATENT DOCUMENTS

| | | |
|---|---|---|
| CN | 101846867 A | 9/2010 |
| CN | 102262843 A | 11/2011 |
| CN | 103365055 A | 10/2013 |
| CN | 103559865 A | 2/2014 |
| CN | 106680992 A | 5/2017 |
| CN | 108089394 A | 5/2018 |
| WO | WO 2013/061803 | 5/2013 |
| WO | WO 2016/186900 A1 | 11/2016 |

OTHER PUBLICATIONS

First Search Report in Application No. 201811022607.4, dated Feb. 23, 2021.
Supplementary Search in 201811022607.4, dated Sep. 27, 2021.
International Search Report issued in application No. PCT/CN2019/076617 dated May 24, 2019.
Extended European Search Report in Application No. 19857521.9; dated Aug. 12, 2021.

* cited by examiner

LIGHT SOURCE SYSTEM AND CONTROL METHOD THEREOF, DISPLAY DEVICE AND CONTROL METHOD THEREOF

TECHNICAL FIELD

The present disclosure relates to the field of display technology and, more particularly, to a light source system, a control method of the light source system, a display device and a control method of the display device.

BACKGROUND

This section is intended to provide background or context for the specific embodiments of the present disclosure as claimed in the claims. The description herein is not recognized as prior art just because it is included in this section.

In the field of display technology, a laser device array is usually used as a light source of the display device, and each laser device in the laser device array is in charge of illumination of a respective region.

However, in practical applications, this method may lead to the following consequences: when an individual laser device in the light source is damaged, a display dead pixel is prone to show in an imaging surface, e.g., a dark spot shown in a projection image or a display image.

SUMMARY

In view of this, the present disclosure provides a light source system that can avoid a dead pixel caused by damage of an individual laser device in the light source system, and the present disclosure further provides a display device, a control method of the light source, and a control method of the display device.

A light source system, including: an array light source comprising M light emitting bodies, each of the M light emitting bodies having independently adjustable brightness; an optical switch disposed on an optical path of light outputted from the array light source, and configured to guide illumination light emitted from the M light emitting bodies to N sub-regions of a preset illumination region; and a control device, configured to control the optical switch to adjust, at a preset frame rate, a direction of the illumination light emitted from each of at least part of the M light emitting bodies, and to guide, during a current image frame, the illumination light emitted from each of the at least part of the M light emitting bodies to a sub-region different from that for one or more image frames previous to the current image frame.

A display device adopting the light source system described above.

A control method of the light source system, the control method including: controlling each of M light emitting bodies of an array light source to emit illumination light having preset brightness; controlling an optical switch arranged on an optical path of light outputted from the array light source to guide the illumination light emitted from the M light emitting bodies to sub-regions of a preset illumination region; and controlling the optical switch to adjust, at a preset frame rate, a direction of the illumination light emitted from each of at least part of the M light emitting bodies, and guiding, during a current image frame, the illumination light emitted from each of the at least part of the light emitting bodies to a sub-region different from that for one or more image frames previous to the current image frame.

A control method of a display device, the control method adopting the control method of the light source system described above, the control method of the display device comprises: after said guiding the illumination light emitted from each of at least part of the light emitting bodies to a sub-region different from that for one or more image frames previous to the current image frame, calculating, according to peak brightness of a sub-region corresponding to each image frame, an illuminance distribution irradiated onto a surface of the light modulating device; and controlling, according to the illuminance distribution and brightness of each pixel in a corresponding frame of to-be-displayed image, the light modulating device to modulate incident light rays.

With the light source system and the display device provided by the present disclosure, it can be ensured that during the current image frame, the illumination light emitted from each of at least part of the light emitting bodies is guided to a sub-region different from that for one or more image frames previous to the current image frame, thereby reducing an influence of an individual light emitting body on a single sub-region, and thus being advantageous to reduce a probability of the emergence of display dead pixel due to the damage of an individual light emitting body.

BRIEF DESCRIPTION OF DRAWINGS

In order to more clearly describe the technical solutions of the embodiments/implementations of the present disclosure, the accompanying drawings for description of the embodiments/implementations will be briefly introduced below. Obviously, the accompanying drawings described below are merely partial embodiments/implementations of the present disclosure, and other drawings may be obtained by those skilled in the art based on these accompanying drawings without creative efforts.

FIG. 4(*b*) illustrates a projection image in a case where the control method of the light source system and the control device shown in FIG. 3 is not adopted, with one of the laser devices being damaged.

FIG. 4(*c*) illustrates a projection image in a case where a control method of a light source system and a control device with one polling cycle including two preset periods is adopted, with one of the laser sources being damaged.

FIG. 4(*d*) illustrates a projection image in a case where a control method of a light source system and a control device with one polling cycle including sixteen preset periods is adopted, with one of the laser devices being damaged.

REFERENCE SIGNS OF MAIN ELEMENTS

| | |
|---|---|
| Display device | 10 |
| Light source system | 100 |
| Excitation light source | 110 |
| Optical switch | 120, 220 |
| Input array | 221 |

-continued

| First reflective element | 122, 222 |
| Second reflective element | 124, 224 |
| Output array | 225 |
| Wavelength conversion device | 140 |
| Control device | 160 |
| Light modulating device | 600 |
| camera lens device | 700 |

The present disclosure will be further described in the following embodiments with reference to the accompanying drawings

DESCRIPTION OF EMBODIMENTS

In order to further illustrate the above-mentioned purpose, features and advantages of the present disclosure, the present disclosure will be described below in detail with reference to the accompanying drawings and specific embodiments. It should be noted that the embodiments of the present disclosure and the features in the embodiments can be combined with each other if no conflict exists.

In the following description, many specific details are set forth in order to better illustrate the present disclosure, and the described embodiments are merely partial embodiments of the present disclosure, rather than all the embodiments. Based on the embodiments of the present disclosure, all other embodiments obtained by those skilled in the art without creative efforts shall fall within a protection scope of the present disclosure.

Unless otherwise defined, all technical and scientific terms used herein have the same meaning as commonly understood by those skilled in the technical field of the present disclosure. The terms used in the description of the present disclosure are merely for describing specific embodiments, but are not intended to limit the present disclosure.

Figure 1:
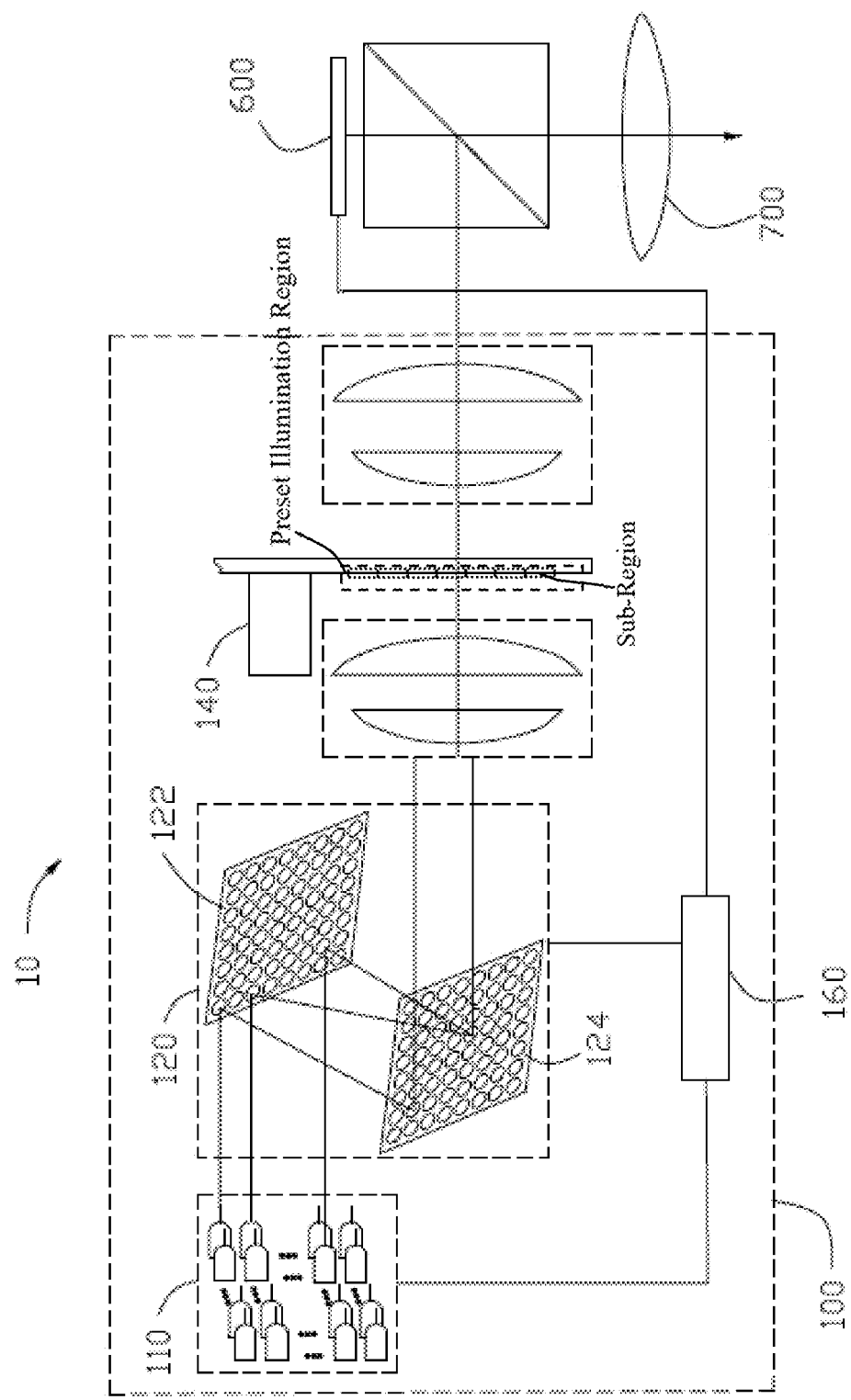
FIG. 1 is a schematic structural diagram of a display device according to a preferred embodiment of the present disclosure.

Please refer to FIG. 1. FIG. 1 is a schematic structural diagram of a display device 10 according to a preferred embodiment of the present disclosure. The display device 10 may be one of a cinema projector, a laser television, an engineering projector, a business education projector, a jointed screen, and a micro projector. In the embodiments of the present disclosure, a projection device is taken as an example for description. It can be understood that the display device 10 may also be any other device mentioned above.

The display device 10 includes a light source system 100, a light modulating device 600, and a camera lens device 700. The light source system 100 provided in this embodiment of the present disclosure is configured to output pre-modulated light source light, and the light modulating device 600 is configured to perform secondary modulation on the light source light to obtain image light to be outputted from the camera lens device 700.

The light source system 100 includes an array light source 110, an optical switch 120, a wavelength conversion device 140 and a control device 160. Among them, the array light source 110 includes more than M light emitting bodies with independently adjustable brightness, and the M light emitting bodies are respectively configured to emit illumination light. A surface of the wavelength conversion device 140 includes a preset region for receiving the illumination light. The surface of the wavelength conversion device 140 is further provided with a conversion region for wavelength conversion of at least part of the illumination light, and the preset region is located in the conversion region on an optical path of the illumination light. The preset region includes N sub-regions, and the N sub-regions may be arranged in an array. The optical switch 120 is disposed between the array light source 110 and the wavelength conversion device 140. The control device 160 is configured to control the optical switch 120 to adjust, at a preset frame rate, a direction of the illumination light emitted from each of at least part of the M light emitting bodies, and guide, during a current image frame, the illumination light emitted from each of the at least part of the light emitting bodies to a sub-region different from that for one or more image frames previous to the current image frame.

Herein, the preset frame rate is associated with a refresh rate of the image frame. In an embodiment, the preset frame rate is equal to the refresh rate of the image frame. In other embodiments, the preset frame rate is greater or smaller than the refresh rate of the image frame.

In the case where an individual light emitting body of the light emitting bodies emits light abnormally, this light emitting body will not constantly irradiate a same sub-region, thereby being advantageous to reduce a probability of the emergence of the display dead pixel due to the damage of an individual light emitting body.

Specifically, the array light source 110 may be one of a laser light source, a laser phosphor light source, a bulb light source, and an LED light source. The array light source 110 may be a blue light source, which outputs blue illumination light. It can be understood that the array light source 110 is not limited to a blue light source, and the array light source 110 may otherwise be a purple light source, a red light source, or a green light source. In an embodiment, the light emitting bodies are blue laser devices, which are configured to emit blue laser as the illumination light. The array light source 110 includes N light emitting bodies. Since a display image is generally rectangular, the N light emitting bodies are arranged in an m*n matrix. It can be understood that the N light emitting bodies may also be arranged in a matrix of other forms. It can be understood that the number of light emitting bodies in the army light source 110 can be selected according to actual needs.

The conversion region of the surface of the wavelength conversion device 140 is provided with a wavelength conversion material. Under excitation of the illumination light, the wavelength conversion material converts the illumination light into light source light. In the embodiments, a specific form of the wavelength conversion device 140 is not limited. In an embodiment, the wavelength conversion device 140 is a fixed fluorescent sheet, and a surface of the fluorescent sheet is provided with yellow fluorescent powder or a combination of yellow fluorescent powder and blue fluorescent powder, or other wavelength conversion materials. In an embodiment, the wavelength conversion device 140 is a color wheel assembly, a surface of the color wheel assembly is provided with the wavelength conversion material, and the color wheel assembly periodically moves under driving by a driving unit thereof. Preferably, the color wheel assembly is provided with a light-filtering unit, and light source light emitted from the wavelength conversion material is filtered by the light-filtering unit and then outputted. In an embodiment, the color wheel assembly is a reflective color wheel or a transmissive color wheel.

The conversion region is disposed on the surface of the wavelength conversion device 140. In an embodiment in which the wavelength conversion device 140 is a fixed fluorescent sheet, since the conversion region is always on the optical path of the illumination light, the preset region is at a fixed position on the fluorescent sheet. In an embodiment in which the wavelength conversion device 140 is a color wheel assembly, since a relative position of a light spot formed by the illumination light on the surface of the color wheel assembly with respect to a fixed point on the color wheel assembly is constantly changing, the preset region is at a constantly changing position on the surface of the color wheel with periodic movement of the color wheel assembly.

In an embodiment, the array light source 110 outputs multiple types of primary-color light as the illumination light, the illumination light irradiates a scattering element or other optical elements, the wavelength conversion device 140 is omitted, then the preset region is located on a surface of the scattering element or other optical elements, and light outputted from the scattering element is emitted from the light source system 100 to obtain the light source light.

As shown in FIG. 1, the incident illumination light and the outputted illumination light of the optical switch 120 are both parallel light arrays, and the optical switch 120 includes a first reflective element 122 and a second reflective element 124. Herein, the first reflective element 122 is parallel to the second reflective element 124, and an angle of 45° is formed between first reflective element 122 and the incident illumination light.

The first reflective element 122 includes a plurality of first micro mirrors arranged in an array, and the second reflective element 124 includes a plurality of second micro mirrors arranged in an array. In an embodiment of the present disclosure, the number of first micro mirrors in the first reflective element 122 is equal to the number of second micro mirrors in the second reflective element 124. The number of first micro mirrors and the number of second micro mirrors are both greater than N, that is, each sub-region corresponds to at least one first micro mirror and at least one second micro mirror. Under control of the control device 160, the illumination light is outputted after being reflected by multiple first micro mirrors and multiple second micro mirrors in sequence. In this embodiment, the light emitting bodies are laser devices or laser device arrays, and each light emitting body emits one or more beams of illumination light. Since the illumination light emitted from each laser device is parallel light with a narrow beam diameter, the beam diameter and the beam divergence angle of the illumination light remain unchanged after the illumination light is reflected by the first micro mirrors and the second micro mirrors, in such a manner that each beam of illumination light outputted from the optical switch 120 can irradiate one sub-region of the preset region.

Both the first micro mirror and the second micro mirror are dual-axis controllable mirrors, that is, the first micro mirror and the second micro mirror can be lifted up and down, rotated, or moved in a first direction and in a second direction. Herein, the first direction is perpendicular to the second direction. In this way, the optical switch 120 can adjust an optical path of each incident illumination light beam, and thus the illumination light can irradiate different sub-regions. In an embodiment, both the first micro mirror and the second micro mirror are triple-axis controllable mirrors, that is, the first micro mirror and the second micro mirror can be lifted up and down, rotated or moved in a three-dimensional space.

The preset frame rate has a frequency unit, the preset frame rate corresponds to one preset period, and a product of the preset frame rate and the preset period is equal to 1. In an embodiment, in each preset period, the control device 160 sets a reflection direction of each first micro mirror and a reflection direction of each second micro mirror. For example, in a previous preset period, the light outputted from a $P^{th}$ first micro mirror is irradiated onto a $P^{th}$ second micro mirror; in a current preset period, the control device 160 controls the light outputted from the $P^{th}$ first micro mirror to be irradiated onto a $(P+5)^{th}$ second micro mirror.

Figure 2:
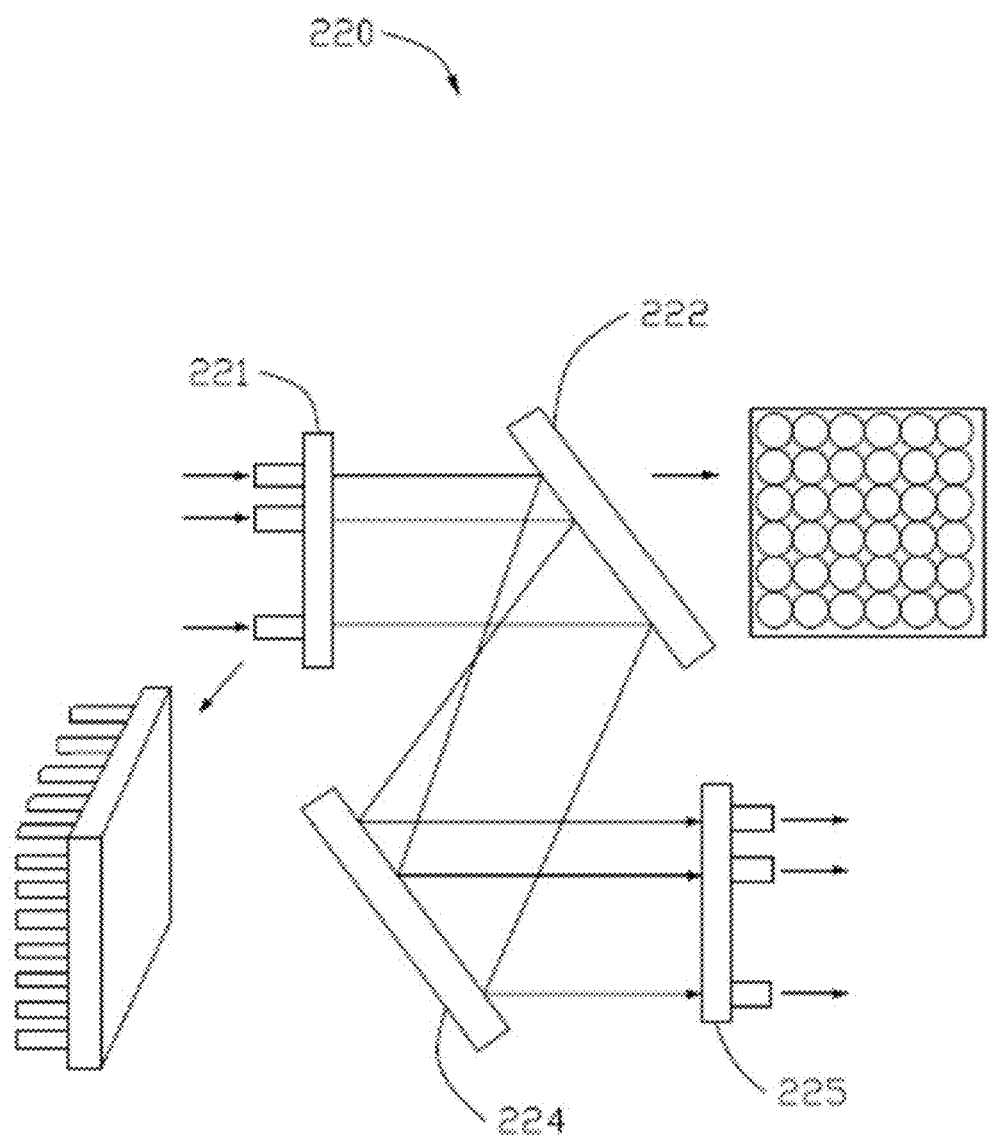
FIG. 2 is a schematic structural diagram of another embodiment of an optical switch shown in FIG. 1.

Please refer to FIG. 2. FIG. 2 is a schematic structural diagram of another embodiment of the optical switch 120 shown in FIG. 1. A main difference of the optical switch 120 provided in this embodiment from the optical switch 220 lies in that the optical switch 220 is a micro-electromechanical (MEMS) optical cross connector. In this embodiment, the optical switch 220 includes an input array 221, a first reflective element 222, a second reflective element 224, and an output array 225. Among them, the input array 221 includes a plurality of input ports, and the output array 225 includes a plurality of output ports. The input ports correspond to the first micro mirrors in one-to-one correspondence, and the output ports correspond to the second micro mirrors in one-to-one correspondence. Under control of the control device 160, the optical switch 220 guides illumination light that is incident onto the optical switch 220 from any input port to be irradiated to a first micro mirror corresponding to the input port, and light outputted from the first micro mirror passes through a preset second micro mirror and is then outputted from an output port corresponding to the preset second micro mirror. Preferably, both the input port and the output port are optical fiber ports, thereby decreasing optical energy loss and facilitating miniaturization of the optical switch 220.

Figure 3:
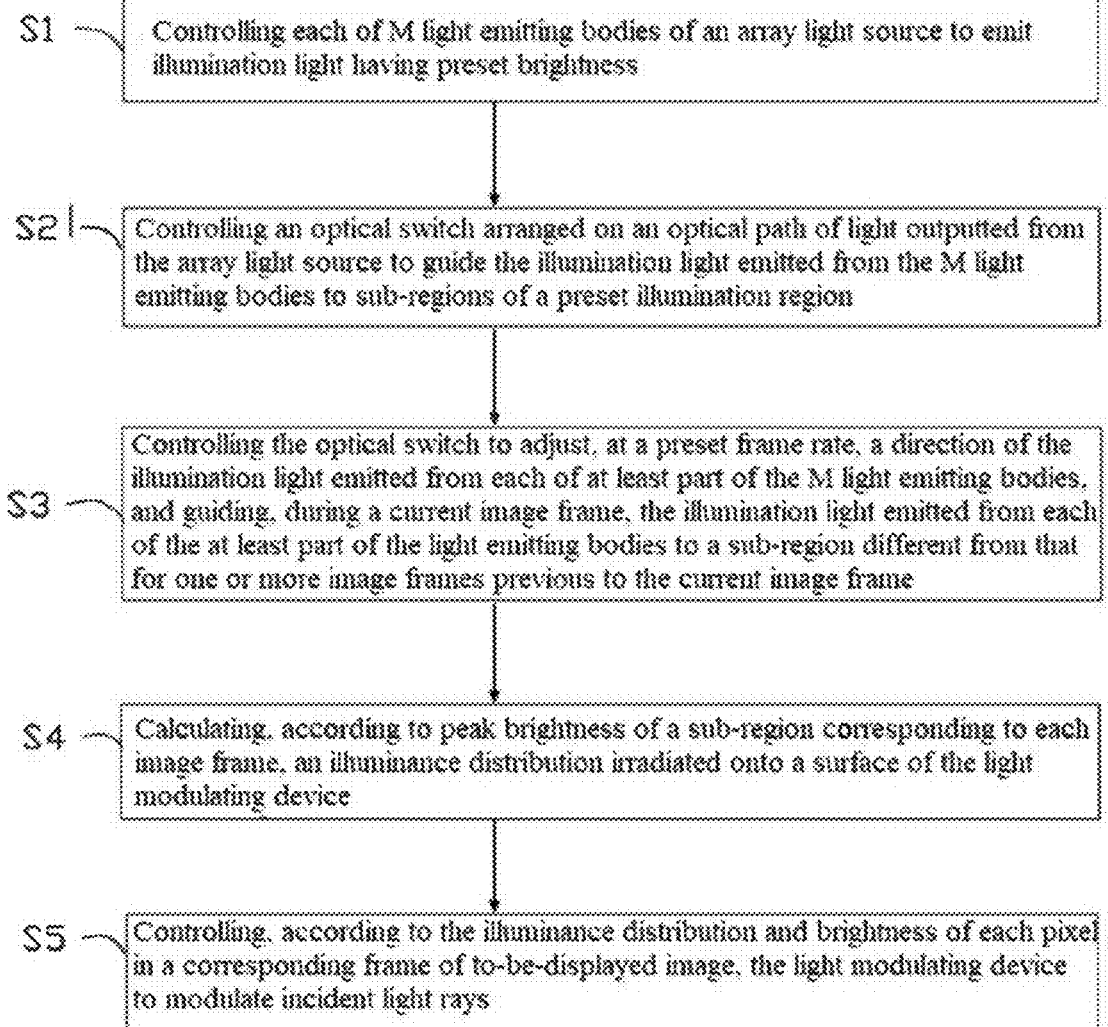
FIG. 3 is a flow chart of a control method of a display device.

Please refer to FIG. 3 in combination with FIG. 1. FIG. 3 is a flow chart of a control method of the display device 10 according to a first embodiment of the display device 10 among the embodiments of the present disclosure. In steps of the control method of the display device 10, steps S1-S3 are steps of the control method of the light source system 100.

At step S1, the M light emitting bodies of the array light source 110 are controlled to emit illumination light with preset brightness.

The control device 160 is electrically connected to the array light source 110, and by controlling a driving current of the array light source 110, the army light source 110 is turned on, turned off and controlled in brightness. In the embodiments of the present disclosure, each light emitting body in the array light source 110 is independently controllable, that is, each light emitting body can be individually controlled to be turned on, turned off or adjusted in brightness. In an embodiment, multiple light emitting bodies share a same control terminal, that is, the control device 160 needs to output a control signal to synchronously control the states of the multiple light emitting bodies.

Further, the M light emitting bodies of the array light source are controlled to respectively emit illumination light with preset brightness according to peak brightness of each region of a frame of a to-be-displayed image, and this process specifically includes steps S101 to S102.

At step S101, the to-be-displayed image is divided into multiple sections according to original image data of the frame of to-be-displayed image, and then peak brightness of each section is obtained.

In the present disclosure, a light source power of each light emitting body is independently adjustable, and the control device 160 divides the to-be-displayed image into multiple sections. Since original image data of each frame of the to-be-displayed image include color coordinates and brightness of each pixel, the peak brightness required to be provided by the array light source 110 for each section can be obtained according to the image data and optical path loss parameters of each section.

In addition, the control device 160 can divide the to-be-displayed image into multiple sections according to the image data of the to-be-displayed image, and combine regions with similar brightness in adjacent blocks into one section. In an embodiment, the control device 160 divides the to-be-displayed image into sections according to the sub-regions, that is, the light outputted from each sub-region irradiates a corresponding section. The control device 160 is configured to obtain each frame of to-be-displayed image, and calculate, based on peak brightness of at least a part of sections in the original image data, peak brightness of corresponding sub-regions, to control the light source power of corresponding light emitting bodies based on the peak brightness of at least part of the sub-regions.

At step S102, according to the peak brightness of each section, the light source power of the light emitting body irradiating the corresponding section in a corresponding preset period is controlled. It can be understood that, in an embodiment, it is also feasible to change the peak brightness in step S101 and step S102 to an average value of the peak brightness.

In an embodiment of the present disclosure, one preset period corresponds to one frame of to-be-displayed image, and the control device 160 adjusts, based on the peak brightness of each section of each frame of to-be-displayed image, the light source power of the light emitting body irradiating the corresponding section. Specifically, according to a mapping relationship between the light emitting body and the section in each preset period, and peak brightness in the corresponding section, the light source power of the corresponding light emitting body is determined.

Assuming that the peak brightness of each light emitting body is 1, according to the peak brightness of each section in the to-be-displayed image in a preset period, the peak brightnesses of the sections No. 0, No. 1, and No. 2 are calculated to be 0.1, 1, and 1.5, respectively. If the light source power of each light emitting body in the array light source 110 is not adjusted by the control device 160, in order to correctly display the to-be-displayed image, then the light source power needs to be increased in such a manner that the light source brightness of the section No. 2 reaches 1.5, and because the excitation light power of the section No. 0 and section No. 1 was originally enough to display the to-be-displayed image, an utilization rate of the light source is further decreased after the light source power is increased. In this embodiment of the present disclosure, in the above-mentioned period, the light source powers of the laser devices irradiating the sections No. 0, No. 1, and No. 2 are adjusted to be 0.1, 1 and 1.5, respectively, thereby being advantageous to increase the utilization rate of the light source and decrease the energy loss of the light source, as well as increase the dynamic contrast of the display device 10.

In an embodiment, the control device 160 is configured to determine the malfunctioning light emitting body and increase the brightness of the adjacent light emitting body, and then compensate for an illumination light field distribution of a dark region on the light modulating device 600 by using a light field diffusion effect of the wavelength conversion device 140 or a diffusion film. In an embodiment, the control device 160 determines the malfunctioning light emitting body through a sensing device, and cuts off a driving current of the malfunctioning light emitting body.

At step S2, the optical switch 120 arranged on the optical path of output light of the array light source 110 is controlled to guide the illumination light emitted from the M light emitting bodies to sub-regions of the preset illumination region.

In an embodiment, the control device 160 transmits a control signal to the optical switch 120, and each first micro mirror and each second micro mirror of the optical switch 120 have a position and a reflection angle of light adjusted according to the control signal.

At step S3, the optical switch 120 is controlled to adjust, at the preset frame rate, a direction of the illumination light emitted from each of at least part of the M light emitting bodies, and during a current image frame, the illumination light emitting from each of the at least part of the light emitting bodies is guided to a sub-region different from that for one or more image frames previous to the current image frame.

Further, in an embodiment, the control device 160 is configured to control the optical switch 120 to guide, during the current image frame, the illumination light emitted from each of the M light emitting bodies to a sub-region different from that for one or more previous image frames. The number of light emitting bodies may be less than the number of sub-regions. In an embodiment of the present disclosure, M≥N, that is, the number of light emitting bodies is greater than or equal to the number of sub-regions.

In each preset period, through the optical switch 120, the illumination light in different sub-regions is controlled to be provided by different light emitting bodies. Continuous N modulation periods form one polling cycle. In different modulation periods of a polling cycle, the optical switch 120 controls the illumination light emitted from any light emitting body to be irradiated to different sub-regions.

The control device 160 controls the optical switch 120 in the light source system 100 to pre-modulate the illumination light. In any continuous N preset periods, that is, in one polling cycle, through the optical switch 120, the control device 160 controls different light emitting bodies to irradiate different sub-regions during each preset period, and controls the illumination light emitted from each light emitting body to be irradiated to different sub-regions in different preset periods of one preset cycle.

In an embodiment of the present disclosure, each preset period corresponds to display time of one frame of to-be-displayed image. It can be understood that, in an embodiment, multiple frames of to-be-displayed images correspond to one preset period.

In an embodiment of the present disclosure, the array light source 110 includes nine light emitting bodies numbered No. 0 to No. 8, and each light emitting body is configured to emit one or more beams of illumination light; N=9, that is, the preset region includes nine sub-regions numbered No. 0 to No. 8, one polling cycle includes N preset periods, and the nine preset periods are numbered No. 0 to No. 8. In one polling cycle, through the optical switch 120, the control device 160 controls the illumination light emitted from different light emitting bodies to be irradiated different sub-regions in each preset period, and controls each light emitting body to irradiate different sub-regions during different preset periods.

In a first preset period of each polling cycle, the control device 160 controls the optical switch 120 to irradiate the illumination light emitted from an $i^{th}$ light emitting body to an $i^{th}$ sub-region, where 0≤i<9; in a $k^{th}$ period of each polling cycle, the control device 160 controls, through the optical switch 120, the illumination light emitted from the $i^{th}$ light emitting body to be irradiated to a $[(i+k) \bmod N]^{th}$ sub-region, where $0<k<N$. In each period, the sub-region corresponding to each light emitting body is related to a remainder of $(i+k) \bmod N$. In a case where $i=0$, the sub-region corresponding to the light emitting body No. 0 in different periods is listed in the following table.

TABLE 1

Sub-region irradiated by light emitting body No. 0 in different periods

| Period No. | Irradiated sub-region No. |
|---|---|
| 0 | 0 |
| 1 | 1 |
| 2 | 2 |
| 3 | 3 |
| 4 | 4 |
| 5 | 5 |
| 6 | 6 |
| 7 | 7 |

Further, when one of the light emitting bodies is damaged, the brightness of the incident light in the preset region will decrease by 1/N. The wavelength conversion device 140 performs wavelength conversion on the incident light in the conversion region to form light source light outputted from the light source system 100. When no saturation occurs, a conversion efficiency of the wavelength conversion device 140 is proportional to the brightness of the incident light in the conversion region, so the brightness of the light source light will also decrease by 1/N.

If an individual light emitting body of the light emitting bodies in the array light source 110 emits light abnormally, the control device 160 controls the illumination light emitted from each of at least part of the light emitting bodies to be irradiated to a sub-region different from that for one or more image frames previous to the current image frame, thereby avoiding an influence of this individual light emitting body on a single sub-region, and thus avoiding a significant dead pixel, such a projected dark spot showing in the display image, caused by the damage of an individual light emitting body.

Please refer further to FIG. 3. The present disclosure further provides a control method of the display device 10, which specifically adopts the control method of the light source system 100 described above. In addition, the control method of display device 10 further includes the following steps after step S3.

Step S4, based on the peak brightnesses of the sub-regions corresponding to each image frame, an illuminance distribution irradiated to a surface of the light modulating device is calculated and obtained.

Since the peak brightness of each section and the light source power of the corresponding light emitting body have been obtained in step S1, the peak brightness irradiated to each sub-region and the peak brightness of the light source light outputted from each sub-region can be obtained. The light source light produced from each sub-region is incident to the light modulating device 600 through a relay system, and the illuminance distribution of the surface of the light modulating device 600 can be obtained based on the optical parameters on the optical path.

At step S5, the light modulating device is controlled to modulate the incident light based on the illuminance distribution and the brightness of each pixel in the corresponding frame of to-be-displayed image.

The control device 160 controls the light modulating device 600 to modulate the incident light based on the illuminance distribution and the brightness of each pixel in the corresponding frame of to-be-displayed image, to output the image light of the to-be-displayed image.

In the light source system 100, the control device 160 is configured to implement the control method of the light source system including steps S1-S3 when executing a computer program stored in a storage device. The control device 160 sequentially executes the steps S1-S3 to ensure that during the current image frame, the illumination light emitted from each of at least part of the light emitting bodies is guided to a sub-region different from that for one or more image frames previous to the current image frame, thereby reducing an influence of an individual light emitting body on a single sub-region. With the control device 160 sequentially executing steps S1-S3, in addition to the advantage of decreasing a probability of the emergence of display dead pixel due to the damage of an individual laser device, the light source power of each light emitting body in the array light source 110 can be dynamically adjusted according to the to-be-displayed image, which is advantageous to increase the utilization rate of the light source and achieve HDR display of the display device 10.

In the display device 10, the control device 160 is configured to implement the control method of the display device 10 including steps S1-S5 when executing the computer program stored in the storage device, so as to control the light modulating device 600 to perform secondary adjustment on the light source light, which is advantageous to achieve High-resolution HDR display of the display device 10.

The step numbers S1-S5 and S101-S102 mentioned above are not intended to limit an order of the steps, and a specific step can be added between or deleted from these steps.

It should be noted that the control device 160 may be a central processing unit (CPU) or other general-purpose processors, a digital signal processor (DSP), an application specific integrated circuit (ASIC), a field-programmable gate array (FPGA) or other programmable logic devices, a discrete gate or transistor logic device, a discrete hardware assembly, etc. A general-purpose control device may be a micro control device, or any conventional control device, etc. The control device 160 is a control center of the light source system 100 and % or the display device 10, and various interfaces and lines are used for connecting the array light source 110, the optical switch 120 and the light modulating device 600 of the display device 10. In an embodiment of the present disclosure, the control device 160 is disposed inside the light source system 100. In an embodiment, the control device 160 is disposed in the display device 10 outside the light source system 100.

Figure 4:
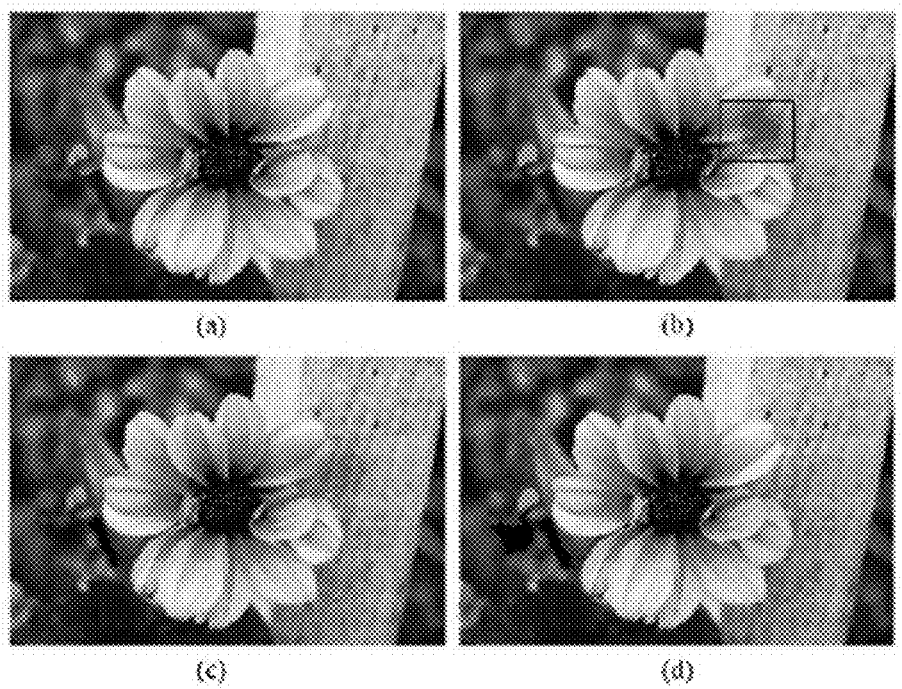
FIG. 4 (*a*) illustrates a projection image under a normal condition.

Please refer to FIG. 4. FIG. 4 illustrates an improvement effect of the control method of the light source system 100 and of the display device 10 on the dead pixel. Among them, FIG. 4 (a) illustrates a projection image under a normal condition; FIG. 4(b) illustrates a projection image in a case where the control method of the light source system 100 and the control device 10 shown in FIG. 3 is not adopted and one of the light emitting bodies is damaged, the box region in the figure clearly showing a projected dark spot, i.e., a display dead pixel; FIG. 4(c) illustrates a projection image in a case where a control method of the light source system and the control device with one polling cycle including two preset periods is adopted and one of the light emitting bodies is damaged, that is, the preset region includes two sub-regions, and the array light source 110 includes at least two light emitting bodies, from which it can be seen that the dark spot is smoothly attenuated; and FIG. 4(d) illustrates a projection image in a case where a control method of the light source system and the control device with one polling cycle including sixteen preset periods and one of the light emitting bodies is damaged, that is, the preset region includes sixteen sub-regions, and the array light source 110 includes at least sixteen light emitting bodies, showing that the influence of the display dead pixel has been basically eliminated. It can be seen that the display dead pixel caused by the damage of an individual light emitting body can be reduced or eliminated by the control method of the light source system 100 and the display device 10, and the more preset periods included in the polling cycle, the smaller the influence of an individual light emitting body on the projection image.

It should be noted that within a scope of the spirit or basic features of the present disclosure, the specific solutions applicable to the first embodiment can also be correspondingly applied to the second embodiment, which will not be repeated herein in order to reduce redundancy of the description and avoid repetition.

For those skilled in the art, it is definite that the present disclosure is not limited to the details of the exemplary embodiments described above, and the present disclosure can be implemented in other specific manners without departing from the spirit or basic characteristics of the present disclosure. Therefore, from any point of view, the embodiments shall be regarded as being exemplary and non-limiting. The scope of the present disclosure is defined by the appended claims rather than the foregoing description, and therefore all changes that fall within the meaning and scope of equivalent elements of the claims are included in the present disclosure. Any reference signs in the claims shall not be regarded as limiting the claims involved. In addition, it is definite that the term "including" does not exclude other elements or steps, and the singular form does not exclude the plural form. The devices stated in the device claims can also be implemented by a same device or system through software or hardware. Words such as first and second are merely used for representing terms, and are not intended to represent any specific order.

Finally, it should be noted that the embodiments described above are merely used to illustrate the technical solutions of the present disclosure, and are not intended to provide limitation. Although the present disclosure has been described in detail with reference to the preferred embodiments, it should be understood by those skilled in the art that the technical solutions of the present disclosure can be modified or equivalently replaced without departing from the spirit and scope of the technical solutions of the present disclosure.

What is claimed is:

1. A light source system, comprising:
an array light source comprising M light emitting bodies, each of the M light emitting bodies having independently adjustable brightness;
an optical switch disposed on an optical path of light outputted from the array light source, and configured to guide illumination light emitted from the M light emitting bodies to N sub-regions of a preset illumination region of a wavelength conversion device; and
a control device, configured to control the optical switch to adjust, at a preset frame frequency, a direction of the illumination light emitted from each of at least part of the M light emitting bodies, and to guide, during a current image frame modulated by a display device, the illumination light emitted from each of the at least part of the M light emitting bodies to a sub-region different from that for one or more image frames previous to the current image frame.

2. The light source system as described in claim 1, wherein a number M of the light emitting bodies is greater than or equal to a number N of the sub-regions.

3. The light source system as described in claim 1, wherein the control device is configured to control the optical switch to guide, during the current image frame, the illumination light emitted from each of the M light emitting bodies to a sub-region different from that for one or more image frames previous to the current image frame.

4. The light source system as described in claim 1, wherein the control device is further configured to obtain each frame of to-be-displayed image and calculate peak brightness of at least one section of the frame of to-be-displayed image, so as to control, based on the peak brightness of the at least one section, light source power of corresponding light emitting bodies.

5. The light source system as described in claim 1, wherein the array light source is one of a laser source, a laser phosphor light source, a bulb light source, and a LED light source.

6. The light source system as described in claim 1, wherein the optical switch is a micro-electromechanical optical cross-connector.

7. A control method of a light source system, wherein the control method comprises:
controlling each of M light emitting bodies of an array light source to emit illumination light having preset brightness;
controlling an optical switch arranged on an optical path of light outputted from the array light source to guide the illumination light emitted from the M light emitting bodies to N sub-regions of a preset illumination region of a wavelength conversion device; and
controlling the optical switch to adjust, at a preset frame frequency, a direction of the illumination light emitted from each of at least part of the M light emitting bodies, and guiding, during a current image frame modulated by a display device, the illumination light emitted from each of the at least part of the light emitting bodies to a sub-region different from that for one or more image frames previous to the current image frame.

8. The control method of the light source system as described in claim 7, wherein said controlling each of M light emitting bodies of an array light source to emit illumination light having preset brightness comprises: controlling each of the M light emitting bodies of the array light source to emit the illumination light having the preset brightness according to peak brightness of each region of a frame of to-be-displayed image.

9. The control method as described in claim 7, wherein a number M of the light emitting bodies is greater than or equal to a number N of the sub-regions.

10. The control method as described in claim 7, further comprising controlling the optical switch to guide, during the current image frame, the illumination light emitted from each of the M light emitting bodies to a sub-region different from that for one or more image frames previous to the current image frame.

11. The control method as described in claim 7, further comprising obtaining each frame of to-be-displayed image and calculating peak brightness of at least one section of the frame of to-be-displayed image, so as to control, based on the peak brightness of the at least one section, light source power of corresponding light emitting bodies.

12. A display device adopting a light source system, wherein the light source system comprises:
- an array light source comprising M light emitting bodies, each of the M light emitting bodies having independently adjustable brightness;
- an optical switch disposed on an optical path of light outputted from the array light source, and configured to guide illumination light emitted from the M light emitting bodies to N sub-regions of a preset illumination region of a wavelength conversion device; and
- a control device, configured to control the optical switch to adjust, at a preset frame frequency, a direction of the illumination light emitted from each of at least part of the M light emitting bodies, and to guide, during a current image frame modulated by the display device, the illumination light emitted from each of the at least part of the M light emitting bodies to a sub-region different from that for one or more image frames previous to the current image frame.

13. The display device as described in claim 12, further comprising a light modulating device, wherein the control device calculates an illuminance distribution on a surface of the light modulating device according to peak brightness of each of the sub-regions, and controls the light modulating device to modulate incident light rays according to the illuminance distribution and brightness of each pixel in a corresponding frame of to-be-displayed image.

14. The display device as described in claim 12, wherein a number M of the light emitting bodies is greater than or equal to a number N of the sub-regions.

15. The display device as described in claim 12, wherein the control device is configured to control the optical switch to guide, during the current image frame, the illumination light emitted from each of the M light emitting bodies to a sub-region different from that for one or more image frames previous to the current image frame.

16. The display device as described in claim 12, wherein the control device is further configured to obtain each frame of to-be-displayed image and calculate peak brightness of at least one section of the frame of to-be-displayed image, so as to control, based on the peak brightness of the at least one section, light source power of corresponding light emitting bodies.

17. The display device as described in claim 12, wherein the array light source is one of a laser source, a laser phosphor light source, a bulb light source, and a LED light source.

18. The display device as described in claim 12, wherein the optical switch is a micro-electromechanical optical cross-connector.

19. A control method of a display device, the control method comprising:
- controlling each of M light emitting bodies of an array light source to emit illumination light having preset brightness;
- controlling an optical switch arranged on an optical path of light outputted from the array light source to guide the illumination light emitted from the M light emitting bodies to N sub-regions of a preset illumination region of a wavelength conversion device;
- controlling the optical switch to adjust, at a preset frame frequency, a direction of the illumination light emitted from each of at least part of the M light emitting bodies, and guiding, during a current image frame modulated by a display device, the illumination light emitted from each of the at least part of the light emitting bodies to a sub-region different from that for one or more image frames previous to the current image frame;
- calculating, according to peak brightness of a sub-region corresponding to each image frame, an illuminance distribution irradiated onto a surface of a light modulating device; and
- controlling, according to the illuminance distribution and brightness of each pixel in a corresponding frame of to-be-displayed image, the light modulating device to modulate incident light rays.

20. The control method as described in claim 19, further comprising calculating the illuminance distribution on the surface of the light modulating device according to peak brightness of each of the sub-regions, and controlling the light modulating device to modulate incident light rays according to the illuminance distribution and brightness of each pixel in a corresponding frame of to-be-displayed image.

* * * * *